US006928415B1

(12) United States Patent
Liberman

(10) Patent No.: US 6,928,415 B1
(45) Date of Patent: Aug. 9, 2005

(54) METHOD OF DELIVERING GROCERIES PURCHASED OVER THE INTERNET

(76) Inventor: Barnet L. Liberman, 421 Hudson St., New York, NY (US) 10014

( * ) Notice: Subject to any disclaimer, the term of this patent is extended or adjusted under 35 U.S.C. 154(b) by 528 days.

(21) Appl. No.: 09/688,482

(22) Filed: Oct. 16, 2000

Related U.S. Application Data

(63) Continuation-in-part of application No. 09/587,201, filed on Jun. 5, 2000.

(51) Int. Cl.$^7$ ............................................. G06F 17/60
(52) U.S. Cl. ............................ 705/15; 383/97; 383/120
(58) Field of Search .......................... 705/7, 8, 15, 16, 705/22; 383/76, 97, 120, 111, 41, 5; 150/102

(56) References Cited

U.S. PATENT DOCUMENTS

| 1,034,050 | A | * | 7/1912 | Williams | ........................ 70/58 |
| 2,128,689 | A | * | 8/1938 | Onstott | ......................... 383/41 |
| 2,159,279 | A | * | 5/1939 | Lipowsky | ..................... 383/22 |

(Continued)

FOREIGN PATENT DOCUMENTS

| JP | 6008466 A | * | 10/1983 | ............ G06F/15/21 |

OTHER PUBLICATIONS

White, Ron, How Computers Work, Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*
Welcome to Webvan.com / 1 web page from www.webvan.com web site (Nov. 10, 2000).
HomeGrocer.com / 1 web page from www.homegrocer.com web site (Nov. 10, 2000).
NetGrocer.com / 1 web page from www.netgrocer.com web site (Nov. 10, 2000).
Peapod.com / 2 web pages form www.peapod.com web site (Apr. 12, 2000).
YourGrocer.com / 7 web pages from www.yourgrocer.com web site (Nov. 10, 2000).

*Primary Examiner*—Andrew J. Fischer
(74) *Attorney, Agent, or Firm*—Cohen, Pontani, Lieberman & Pavane

(57) ABSTRACT

Groceries ordered over the Internet by a particular time in the early evening may be delivered by the next morning to a location within a 5–6 hour delivery radius of a warehouse. The grocery order is filled at the warehouse, where the groceries are placed in a tote for delivery. If perishable groceries are to be delivered, a frozen insert is placed in the tote to maintain the groceries at a desired temperature. The filled tote is placed on a rack, which is removable with the tote on it. The racks have shelves that are pitched such that when a first tote is removed a second tote behind the first tote falls into the space previously occupied by the first tote. In the early evening, after the cutoff time for placing orders, the rack and totes on the rack are transferred to a first vehicle, typically a large trailer, that transports the rack and totes to a transfer point where the rack and the accompanying bill of lading are transferred to a second smaller vehicle, such as a van. The van delivers the totes to customers along a pre-established route. Upon reaching a delivery destination (usually a customer's home) by early the next morning, the van driver removes the tote for that customer from the van and secures it at the delivery destination. The tote may be secured in a locked expandable bag, such as a mesh net or insulated bag, that is itself secured to a grocery box. Alternatively, the tote may be secured by looping a chain or cable through and around a pair of eyelets on the tote. The customer removes the tote from the bag, removes the groceries from the tote, and returns the used tote to the bag for later pickup by the van.

18 Claims, 14 Drawing Sheets

U.S. PATENT DOCUMENTS

| | | | | |
|---|---|---|---|---|
| 2,301,639 A | * | 11/1942 | Greene | 414/498 |
| 2,310,627 A | * | 2/1943 | Faris | 70/68 |
| 2,710,639 A | * | 6/1955 | Thompson | 383/26 |
| 3,237,721 A | * | 3/1966 | Fullington | 186/54 |
| 3,628,807 A | * | 12/1971 | Fullington et al. | 280/79.3 |
| 4,037,853 A | * | 7/1977 | Sparks | 280/204 |
| D328,550 S | * | 8/1992 | Mogil et al. | |
| 5,848,399 A | * | 12/1998 | Burke | 705/27 |
| 6,026,376 A | * | 2/2000 | Kenney | 705/27 |
| 6,026,377 A | * | 2/2000 | Burke | 705/27 |
| 6,155,715 A | * | 12/2000 | Lake et al. | 383/6 |
| 6,204,763 B1 | * | 3/2001 | Sone | 340/568.1 |
| 6,246,998 B1 | * | 6/2001 | Matsumori | 705/27 |
| 6,249,773 B1 | * | 6/2001 | Allard et al. | 705/26 |
| 6,304,855 B1 | * | 10/2001 | Burke | 705/27 |
| 6,381,583 B1 | * | 4/2002 | Kenney | 705/26 |
| 6,426,699 B1 | * | 7/2002 | Porter | 340/568.1 |
| 6,513,017 B1 | * | 1/2003 | Howard et al. | 705/28 |

* cited by examiner

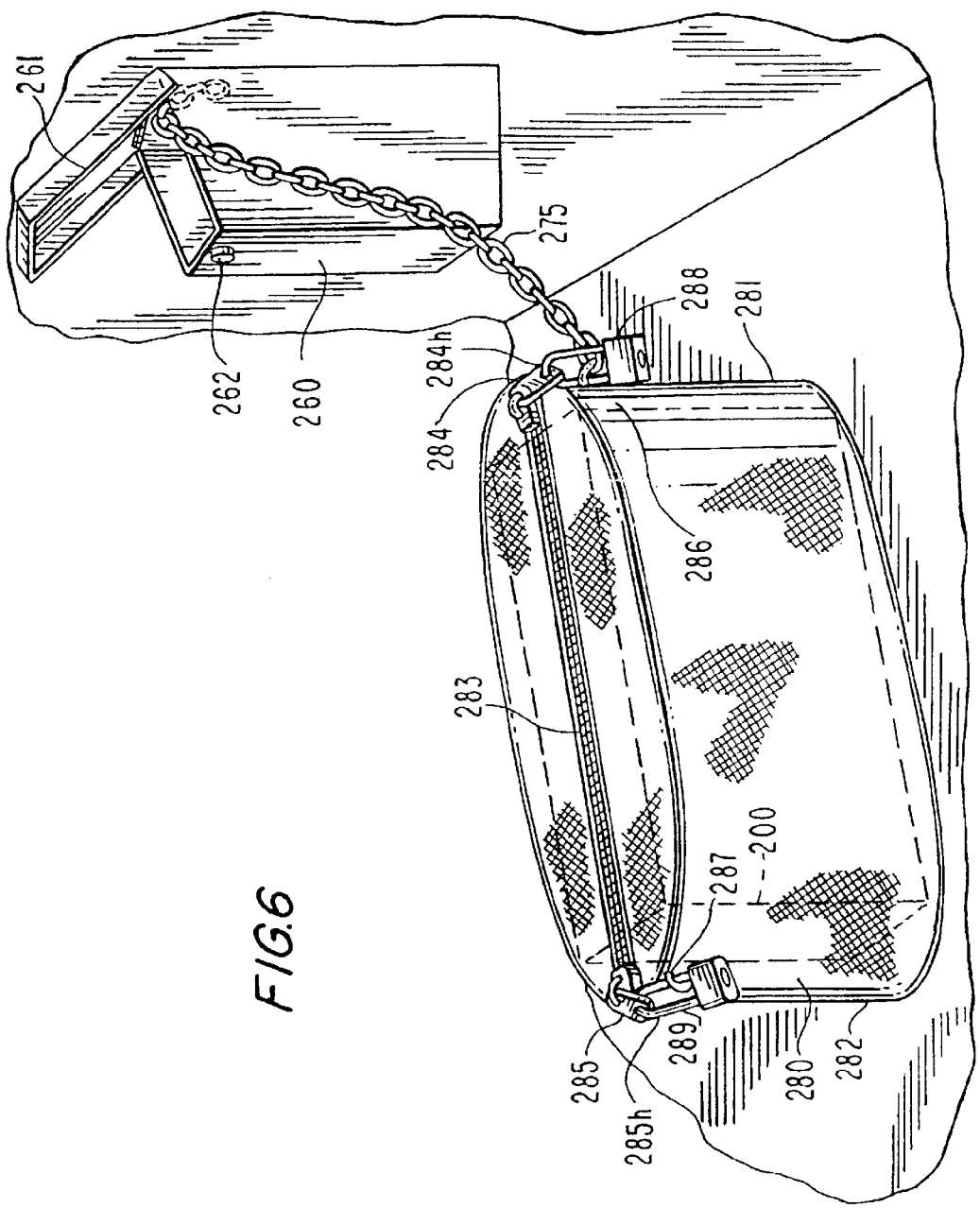

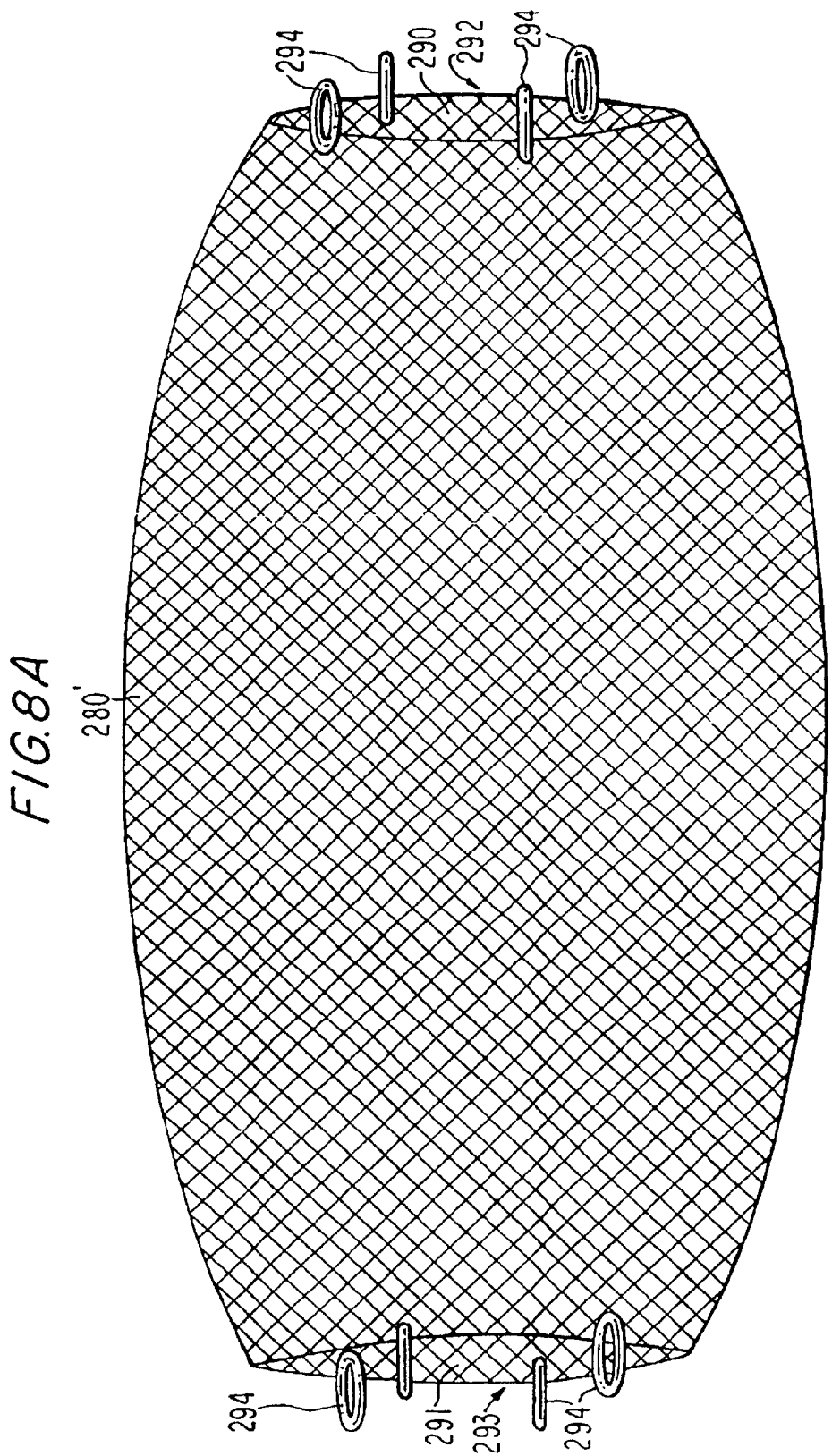

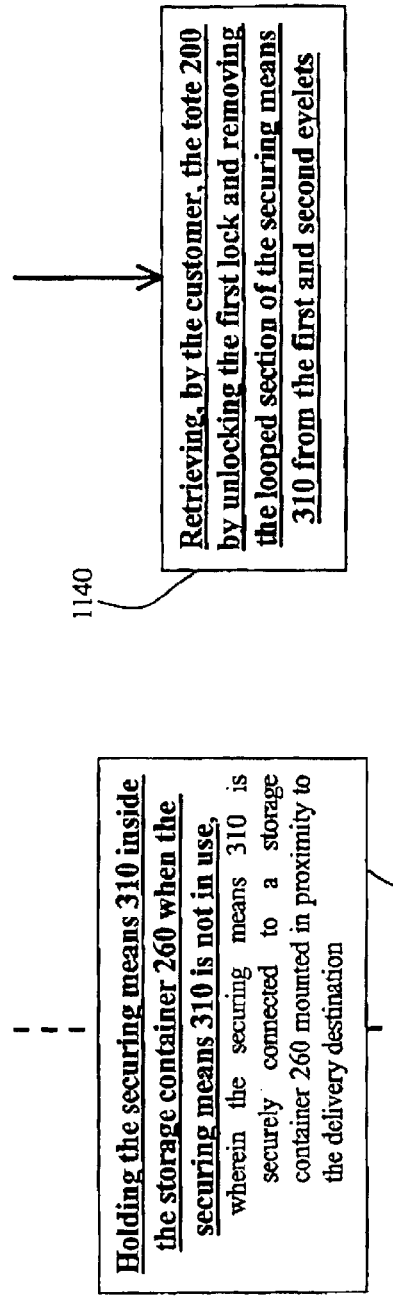
FIG. 11C
FIG. 11A
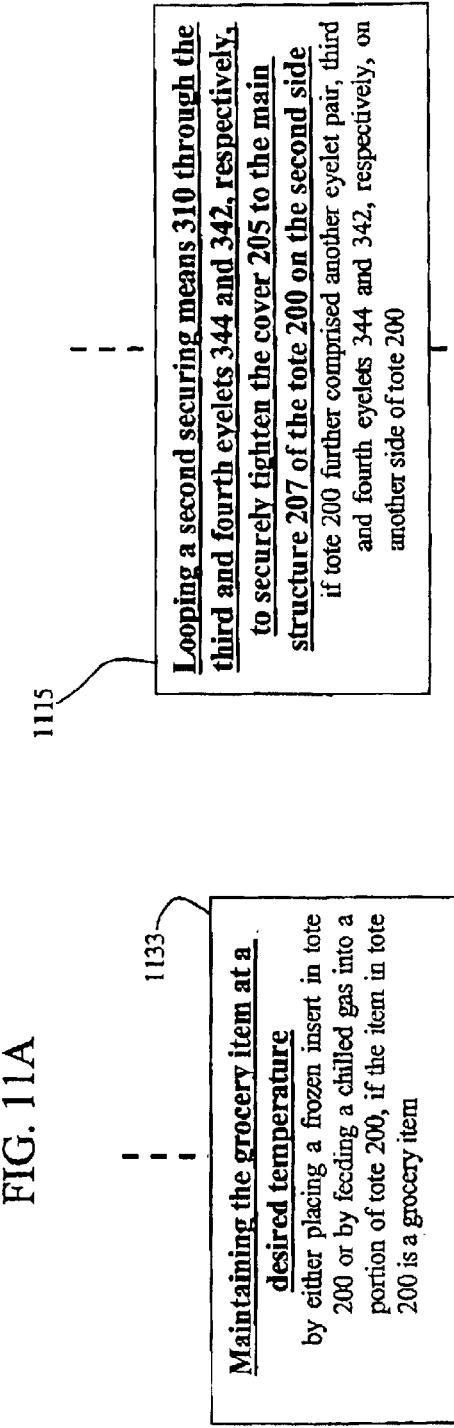
FIG. 11D
FIG. 11E

METHOD OF DELIVERING GROCERIES PURCHASED OVER THE INTERNET

RELATED APPLICATIONS

This application is a Continuation-in-Part of U.S. patent application Ser. No. 09/587,201 filed Jun. 5, 2000.

BACKGROUND OF THE INVENTION

1. Field of the Invention

This invention relates to a method for distributing groceries that are ordered over the Internet, or by some other remote means such as by phone, email, or fax.

2. Description of the Related Art

Some grocers have in recent years sought to develop businesses in which a full line of groceries may be sold over the Internet as an alternative to in-store sales. Selling merchandise over the Internet eliminates the need to maintain an abundance of sales personnel and thereby reduces costs. However, costs remain unnecessarily high for these Internet grocers because they have sought to emulate the business model of a conventional supermarket. Thus, they offer a full array of products, including both perishable and non-perishable items, and promise quick delivery, such as delivery within 30 minutes.

To meet these goals, the Internet grocers have established an abundance of warehouses for stocking the groceries in close proximity to each service area to which the groceries are to be delivered. The amount of capital required to maintain multiple warehouses in each neighborhood has limited the potential to achieve profitability as well as the business' ability to expand the number of areas they can service.

Moreover, in the existing business model, delivery people also serve as customer service personnel who interact with the customers by handling customer orders and complaints. It is difficult to find an abundance of qualified people who have the requisite customer relations skills and who are willing to perform such multiple responsibilities at a reasonable cost, particularly during prosperous economic times when the available labor pool is relatively small.

In an effort to service areas outside their local delivery areas, some Internet grocers offer to ship non-perishable groceries via an overnight delivery service. But the Internet grocers have found it challenging, if not impossible, to find an economical method of delivering perishable groceries, including dairy products, meats, frozen goods, and fresh fruits and vegetables outside of their local delivery areas without the groceries becoming spoiled. Perishables may be delivered without spoilage in refrigerated delivery trucks. However, refrigerating the delivery trucks is extremely expensive, results in increased pollution levels, and wastes a great deal of energy, particularly where the truck is filled with both perishables as well as non-perishables that do not require refrigeration.

It would be advantageous to have an alternative method of quickly and economically delivering groceries, which requires fewer resources, including fewer customer service personnel, and less capital outlay per area served.

SUMMARY OF THE INVENTION

It is an object of this invention to provide a method of doing business in which fresh and frozen products, as well as dry goods, may be delivered to the consumer quickly, efficiently, economically, and in an environmentally responsible way.

The present invention provides a method of distributing groceries ordered by a customer over the Internet, by email, by fax, or by some other means. Customers place their orders by an early evening cutoff time for delivery of items on the following morning. If the deliveries are not placed by the cutoff time, delivery of the items will be delayed by one day. The grocery order is filled by a clerk at a warehouse within a 5–6 hour delivery radius of the delivery destination specified by the customer. The clerk places the groceries in a tote, which may be partitioned into at least two sections. To serve a larger area with a larger radius while maintaining the 5–6 hour delivery time, one or more additional warehouses will be established. Means for maintaining the groceries at a desired chilled temperature are introduced into the tote when perishable groceries are to be delivered. These means may be, but are not limited to, a frozen insert placed into the tote before the tote is sealed or a chilled gas pumped into a portion of the tote.

After being sealed and filled with chilled gas (if necessary) the tote is placed on a rack that is mounted by a bracket or similar means onto a rack holder. The rack holder may have rollers on the bottom to enable the rack holder to be rolled with the racks thereon from place to place. The rack is removable from the rack holder with the tote on it and has shelves that are pitched or biased such that when a first tote is removed a second tote behind the first tote falls into the space of the first tote. There will generally be multiple racks of totes for delivery each day.

After the rack of totes is prepared for shipping, which is usually after the order cutoff time, the rack with the totes thereon is transferred to a first vehicle, typically a large trailer, that transports the rack (and totes) to a transfer point somewhere between the warehouse that filled the order and the delivery destination. At the transfer point, the rack is transferred to a second smaller vehicle, such as a van. The transfer occurs usually in the late evening or early the next morning. The van then delivers the totes to customers along its route.

Upon reaching a delivery destination, usually a customer's home, by early the next morning, the van driver removes the tote from the van for that customer and places it in a specially designed expandable bag, supplied to the customer along with a study, relatively small box in which the bag is stored when the bag is not in use. The box is permanently affixed to a post, such as to the ground or a door. Given its use in a method of delivering groceries, the box is referred to herein, for convenience, as a grocery box, although no groceries are necessarily placed within the box. The bag may be a mesh net or insulated bag secured by a cable or a chain to the box. An opening in the bag through which the tote is inserted is generally kept locked. Access to the bag may be available through two separate locks to permit separate access for the van driver and the customer.

To place the tote in the bag, the van driver removes the locked bag from the grocery box, opens a first of the two locks to gain access to the inside of the bag, inserts the tote in the bag, locks the first lock, and leaves the bag containing the tote on the ground near the grocery box while the bag remains secured to the grocery box. Multiple totes may also be simultaneously delivered and secured outside a delivery destination by placing the totes in a large size bag. The totes remain locked in the bag until the customer opens the second lock, removes the tote, closes the second lock and places the locked bag back into the grocery box. The customer thereafter removes the groceries from the tote and returns the used tote to the bag outside the grocery box before the next expected delivery to that customer, at which time the delivery driver will pick up the emptied tote. The emptied totes are nestable within one another, allowing more than one emptied tote to be placed in the bag for return to the grocer. Rather than placing the bag with the tote outside the grocery box, a grocer may supply the customer with a grocery box large enough to place the bag along with the enclosed tote inside the grocery box.

The tote may be provided with a mechanism for securing the tote without the need for placing it in a bag at the delivery destination. In this alternative, the tote comprises a main structure, a cover, and a pair of eyelets, including a first eyelet located on a first side of the exterior of the main structure and a second eyelet located on the first side of the exterior of the cover such that when the cover is closed onto the main structure the first and second eyelets are substantially in proximity to one another. The totes with eyelets may be secured to a mounting means at the delivery destination, using a securing means, such as a multi-section chain or cable, a section of which is looped through the first and second eyelets to secure the tote to the mounting means. The mounting means may comprise a storage container, such as a box in which the securing means may be stored when not used to secure a tote.

The multi-section securing means may comprise three sections, each having first and second ends. In this instance, when no tote is connected to the securing means, the securing means is secured to the mounting means by connecting a first end of each of the first and third sections of the securing means to the mounting means, locking the first end of the second section to the second end of the first section with a first lock, and locking the second end of the second section to the second end of the third section with a second lock. When the securing means is not in use, it may be stored in the storage container.

To deliver the tote having eyelets, the securing means is removed from the grocery box while remaining attached to the grocery box, the first lock is opened by the van driver/ delivery person to separate the first and second sections of the securing means. The first end of the second section is then inserted through the first and second eyelets and is looped around and inserted through the first and second eyelets a second time to form a loop which is tightened to securely seal the cover to the main structure of the tote at a first position. The first and second sections are locked together with the first lock in a manner that tightly maintains the loop. A customer removes the second lock to disconnect the second and third sections and removes the loop formed with the second section from the first and second eyelets to disconnect and retrieve the tote. The customer may then lock together the second and third sections with the second lock, and store the securing means back in the grocery box when not in use. The customer wishing to leave the tote for pickup by the van driver at the delivery destination can secure the tote by looping the securing means through the first and second eyelets of the tote. A two-section securing means with a single lock, openable with two distinct mechanisms, such as two different keys, one for the van driver for delivery purposes and one for the customer, offers one alternative to a three section securing means.

An additional pair of eyelets, including a third eyelet on the exterior of the cover and a fourth eyelet on the exterior of the main structure, may be located on the exterior of the tote, such as on a second side opposite the first side. A second securing means, which may be similar to the first securing means, may be provided to loop through the third and fourth eyelets similar to the first loop around the first and second eyelets to form a second loop which is tightened to securely seal the cover to the main structure of the tote at a second position on the tote. In lieu of or in addition to the third and fourth eyelets, a hinge connecting the cover and main structure of the tote may be located on any side of the tote.

Multiple totes having eyelets may be secured by placing the totes adjacent to or stacked above one another and looping the first securing means, and the second securing means as well, if any, through the eyelets without requiring a bag to secure the tote.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 6 is an isometric view of the expandable bag in its fully expanded state with a two-way zipper used as a means for securing the tote within the grocery box;

FIG. 8A is a top view of an alternative bag used as a means for securing the tote within the grocery box;

FIGS. 11A, 11C, 11D, and 11E show various possible additional steps to the steps of FIG. 11.

DETAILED DESCRIPTION OF THE PRESENTLY PREFERRED EMBODIMENTS

Figure 1:
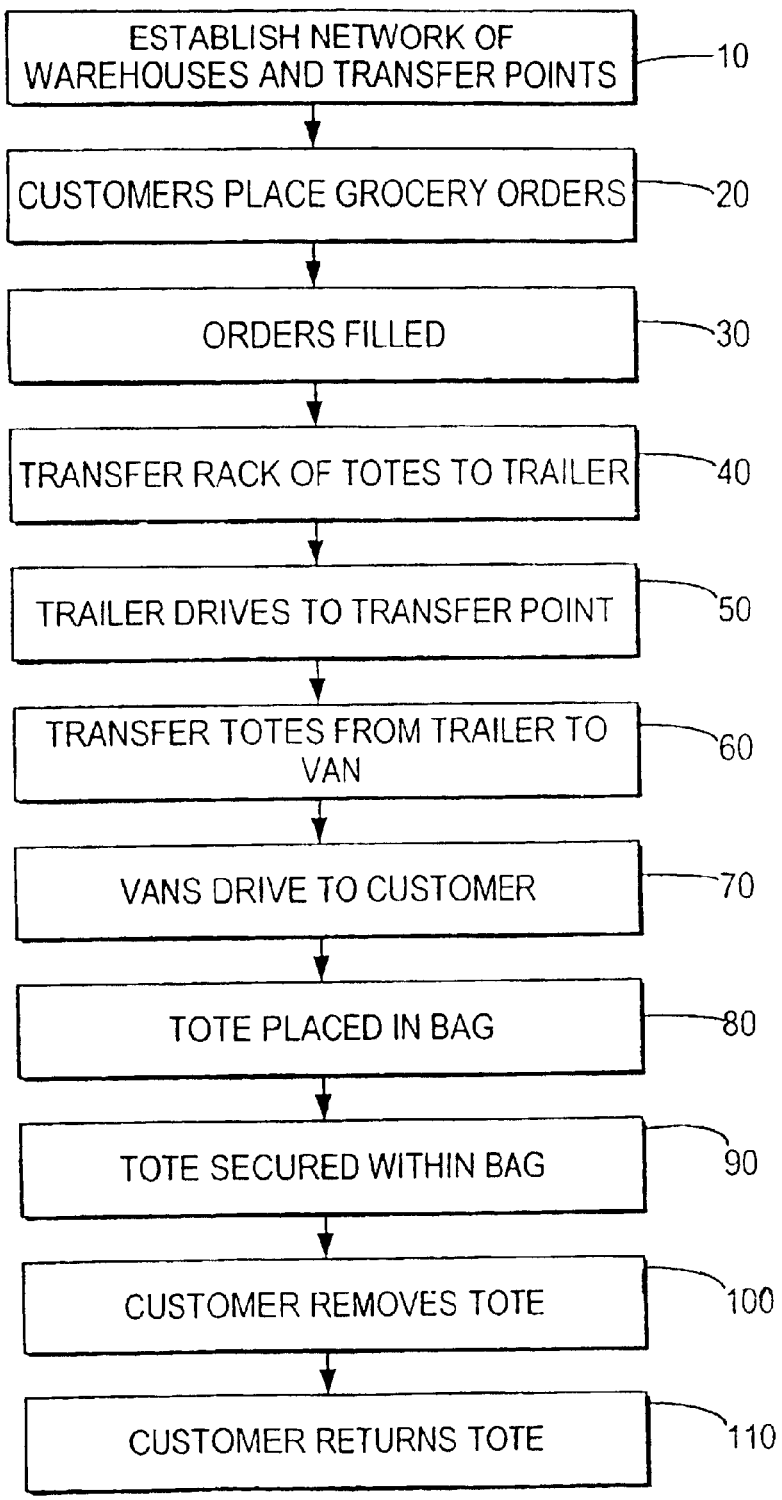
FIG. 1 is a flow chart illustrating the steps for practicing the method of the present invention.
Figure 2:
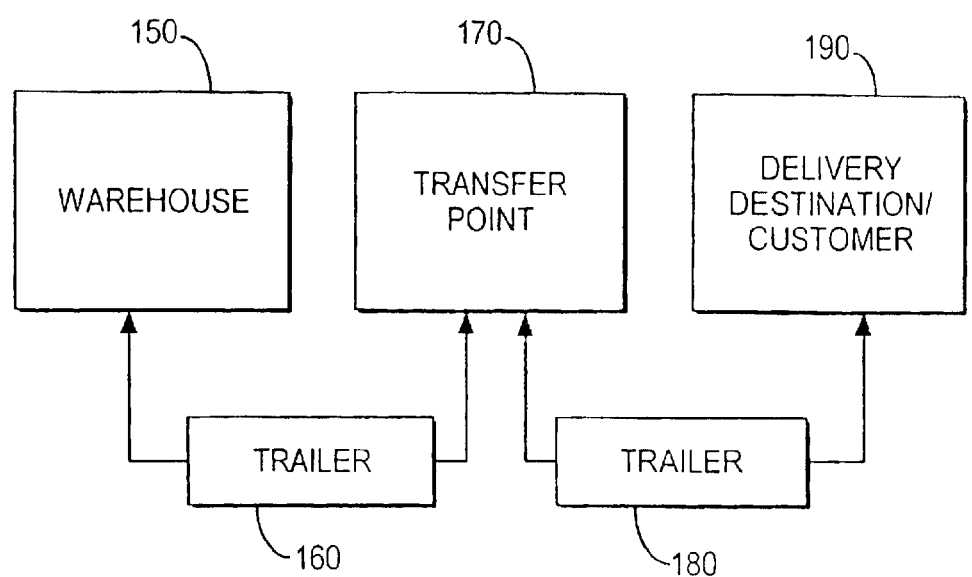
FIG. 2 is a block diagram of the distribution system for practicing the present invention, including the various locations between which the groceries are transported and the methods of transporting the groceries between these locations.

FIG. 1 illustrates the steps for practicing the method of the present invention. At step 10, a business establishes a network of warehouses 150 and transfer points 170, shown in FIG. 2. Warehouses 150 are generally designed to be large enough to stock a large variety of products, some requiring refrigeration, and to maximize turnover and variety. Transfer points 170 located at points between the warehouses and a cluster of potential customers' homes (or some other delivery destination) 190 are established as locations at which large trailers 160 transporting the groceries can transfer the groceries to smaller transport delivery vehicles like vans 180 to deliver the groceries to the customers' homes 190. As an alternative to trailers 160, other means of transportation like rail lines (not shown) may be used to transport the groceries to transfer points 160. The warehouses 150 are situated such that there is an approximately a 5 to 6 hour travel radius from any warehouse 150 in the network to a customer's delivery location, e.g., home, including the time it takes to transfer groceries between trailers 160 and vans 180 at transfer points 170. Because travel times for a given distance may vary due to traffic congestion, speed limits, or other reasons, the appropriate distances to achieve a maximum acceptable travel radius will have to be determined at the time the locations for the warehouses are selected. This problem should be reduced by confining deliveries to the late night/early morning time frame. Placement of the warehouses 150 should also take into consideration whether the potential location can attract an adequate labor pool of part-time order packers who can staff the warehouses 150 in the early evening.

Figure 3:
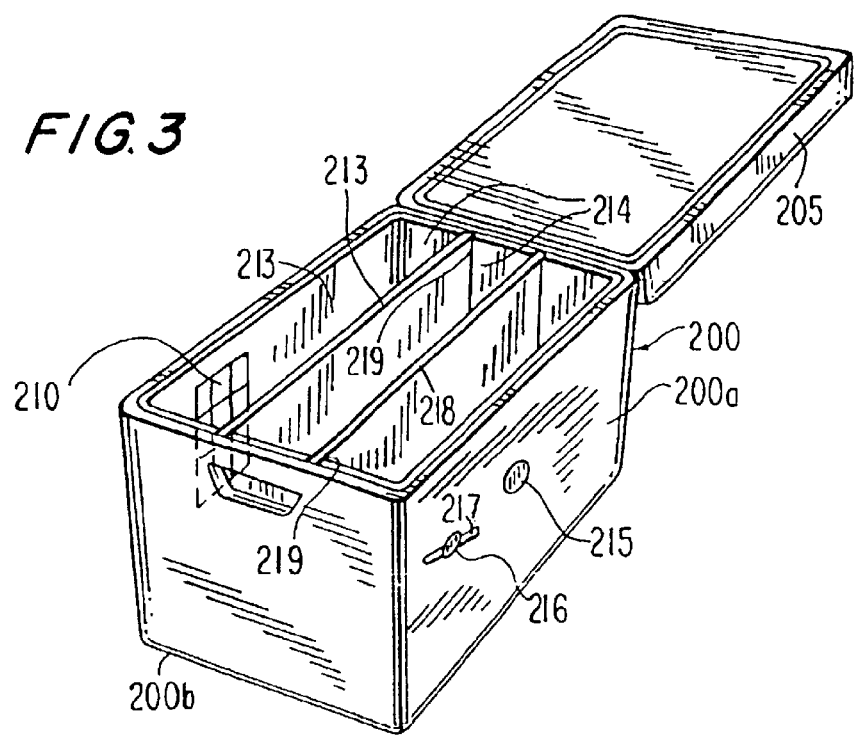
FIG. 3 is an isometric view of a tote used for transporting the groceries.

Customers place orders for groceries at step 20. The orders may be placed at any time via the Internet, such as by accessing a designated Web site, e-mail, or by phone, or fax, or by standing order in which a customer specifies groceries to be delivered on a regular basis, or by any other means, and are received by the grocery supply establishment. For various reasons, including efficiency, simplicity, and minimizing staffing, the Internet is a preferred means of accepting orders. Customers must place their orders by some early evening cutoff point, such as 7 p.m., in order to receive their orders by the next day. (More remote locations may have an earlier cutoff point, such as at 5 or 6 p.m.) At step 30, the orders are filled at warehouses 150 by personnel, mostly part-time employees, who select the grocery items ordered (and any other non-grocery items sold by the business and stocked at the warehouse) off the appropriate shelves in the warehouse and load the groceries ordered by a particular customer into an appropriately-sized tote 200 (FIG. 3) or in a portion of tote 200.

Totes 200, which may come in different sizes (one possible size is 12"H×12"W×24"L), may be made of a sturdy, washable material, such as a strong plastic designed to hold dry goods, refrigerated, and frozen products within a cavity 213 in the tote, and have a cover 205 to seal the cavity 213 of tote 200. The cavity 213 of tote 200 may be partitioned into multiple sections 217 with an insulated material 218 held within vertical grooves 219 cut at intervals along the length or width of cavity 213. For example, where a tote is 12"H×12"W×24"L, grooves 219 may be cut every 2 inches along the width of tote 200 at points between 4" to 16" from a first side 200a of the tote. The partition may also extend into the bottom 200b and cover 205 of tote 200 so that a section of the tote 200 can be pressurized with a chilled gas, like carbon dioxide or nitrogen, as described below.

The groceries are kept at a desired chilled temperature, whether frozen or refrigerated, within totes 200 or within sections 217 of totes 200. This may be accomplished in various ways. For example, a frozen insert 210 containing an appropriate mix of frozen cells, such as a belt of encapsulated ice substitute described in U.S. Pat. No. 5,860,202 entitled *Process for Preparing Ice Substitutes* may be inserted as a lining in the tote 200. The tote can then be sealed with cover 205. Another means of freezing or refrigerating the groceries within totes 200 is by first sealing tote 200 and then introducing a chilled gas, such as chilled nitrogen or carbon dioxide via a pressure relief valve 215 on the tote 200. The chilled gas may be introduced into the entire tote 200 or only a section 217 of the tote 200. The pressure relief valve 215 has a mechanism (not shown) for opening the valve before tote 200 is opened.

Where a frozen insert 210 is used, different combinations of cells having different freezing points may be used to maintain a desired temperature having two points at which the heat of fusion is absorbed to maintain the desired temperature for a longer time in combination with any insulation provided by the shell of or lining on the interior of tote 200. It is desirable to provide sufficient refrigeration and insulation to maintain the desired temperature for at least 16 hours in an 80° F. atmosphere. If the groceries do not completely fill tote 200, packaging materials, such as Styrofoam or bladders, may be used to fill any voids in tote 200. The size of the tote 200 used to fill an order and the amount of fill need to fill a void in a tote 200 may be readily determined in any known manner at the time the order is entered on the Internet.

Figure 4:
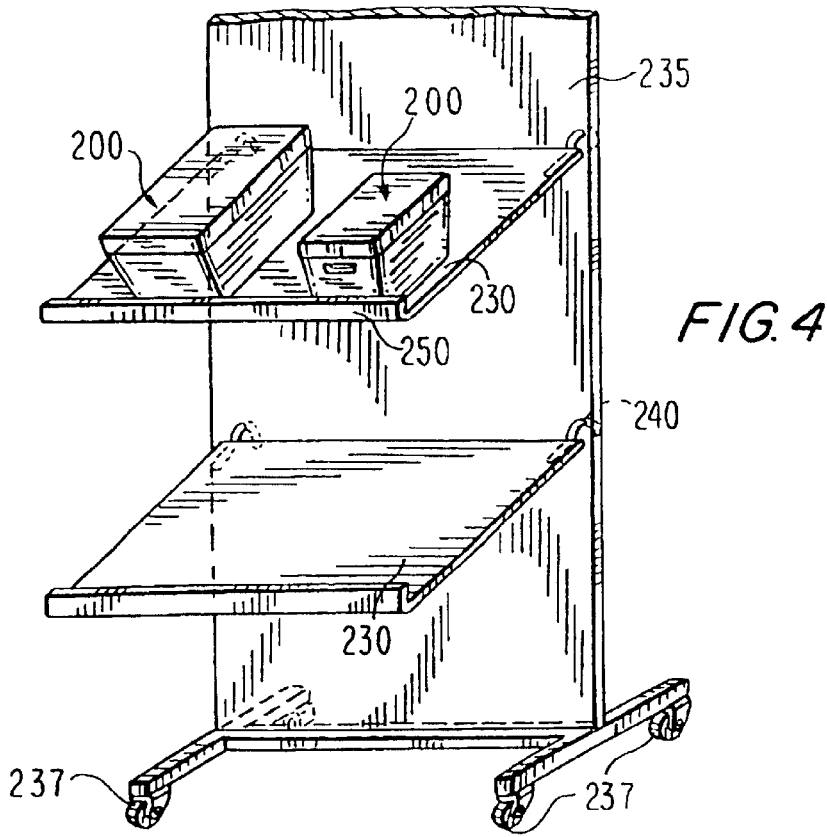
FIG. 4 is an isometric view of a portion of a rack holder having pitched shelves on which the totes of groceries are placed.

After an order is processed, the filled tote 200 is loaded onto racks 230 which are mounted on rack holders 235 in the warehouse 150 (FIG. 4). Rack holders 235 may have rollers 237 on their legs to allow them to be rolled from place to place. The racks 230 have a mounting means, which may be any conventional means of mounting racks such as one or more brackets 250, to mount the racks 230 so they can be loaded with heavy totes of groceries and be removed with the totes on them, such as manually or by forklift. As with the totes 200, racks 230 may be any appropriate size on which the totes 200 may be placed. An appropriate size for each of racks 230 will depend on the van or other delivery vehicle configuration but two useful sizes of racks 230 may be approximately 6 cubic feet (6'×6'×6') and 4'×8'×8'.

After the cutoff time for ordering (which in the present example is 7 p.m.), racks 230 are transferred within a desired time frame, e.g., between 7 and 9 p.m., from the warehouse 150 and are loaded onto trailers 160 where racks 230 are mounted on rack holders (not shown), similar to rack holders 235, for transport (or rack holders 235 that have rollers may be rolled from a loading dock at the warehouse 150 onto trailer 160). Trailers 160 may be equipped with a high/low, as on masonry trucks, to load and off load. The racks are slightly pitched downward over an angle θ so that after removal of a tote 200 from the front of rack 230, the next tote 200 behind the removed tote would fall into the space previously occupied by the first tote by gravity and/or the agitation of the truck's normal movement and/or by use of a pushing mechanism or biasing means such as a spring (not shown). A lip 240 along the front edge or rack 230 prevents the totes 200 from falling off the racks 230. When a pitch is used, the pitch should not be so large so that the tote behind the removed tote falls into place immediately.

After loading, the trailers 160 are dispatched (step 50), which in our example would be by 9 p.m. Trailers 160 which have the farthest distance to travel would be loaded first and would leave the warehouse first. Trailers 160 drive to appropriate transfer points 170. Transfer points 170 need not be facilities devoted exclusively to this purpose; transfer points 170 may be, for example, locations that are otherwise unused in the evenings, such as supermarket parking lots or other locations that are not used in the late night/early morning hours, such as between approximately 10 p.m. and 2 a.m. Racks 230 are off loaded by transferring entire racks 230 or entire rack holders 235, either manually or by an automatic mechanism, to awaiting vans 180 (having appropriate rack holders, if the rack holders themselves are not transferred) for delivery to the various customers' homes (step 60). To simplify the off-loading of racks 230 from trailers 160, the floor of each trailer 160 may be at the loading height of van 180 such that van 180 may pull up to the rear or side of trailer 160, depending on where the lift gate of the trailer 160 is located, the lift gate is raised, and the racks 230 moved through the opening directly onto the van 180. Where rack holders 235 have rollers and are transferred with racks 230, a rack holder 235 may be rolled easily from trailer 160 to van 180. As each van 180 generally has a route that requires it to deliver less than all of the totes 200 on a single trailer 160 and a rack 230 is to be transferred with totes 200 already on the rack 230, it is preferable to load onto a rack 230 only totes 200 that are to be delivered by a single van so that totes 200 do not have to be shifted between racks 230 at a transfer point 170. A bill of lading and a previously-determined route sheet are also delivered to the van driver.

For increased efficiency, totes 200 are loaded onto the vans 180 in reverse of the order that the totes 200 are to be delivered so that the first tote 200 to be delivered is accessible to the van driver first, the second tote is accessible second, etc. The trailers 160 may also be loaded at warehouse 150 to enable the offloading of totes 200 onto the various vans 180 at transfer point 170 in the desired "reverse" order for more efficient delivery by vans 180.

Figure 5A:
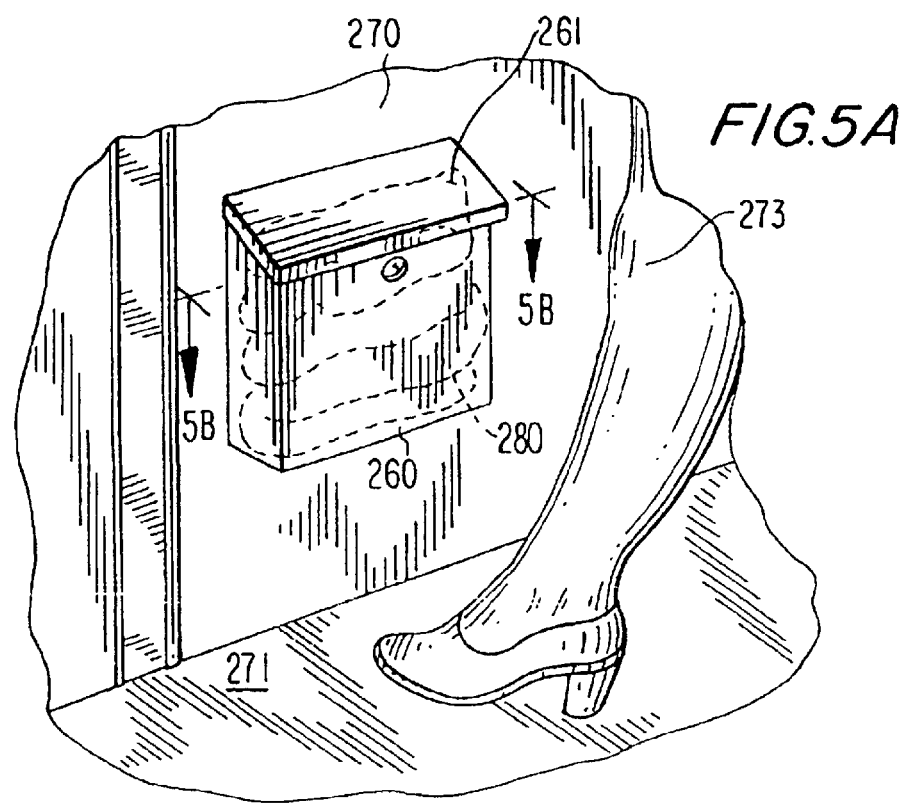
FIG. 5A is a perspective view of a grocery box of the present invention as mounted on a well.
Figure 5C:
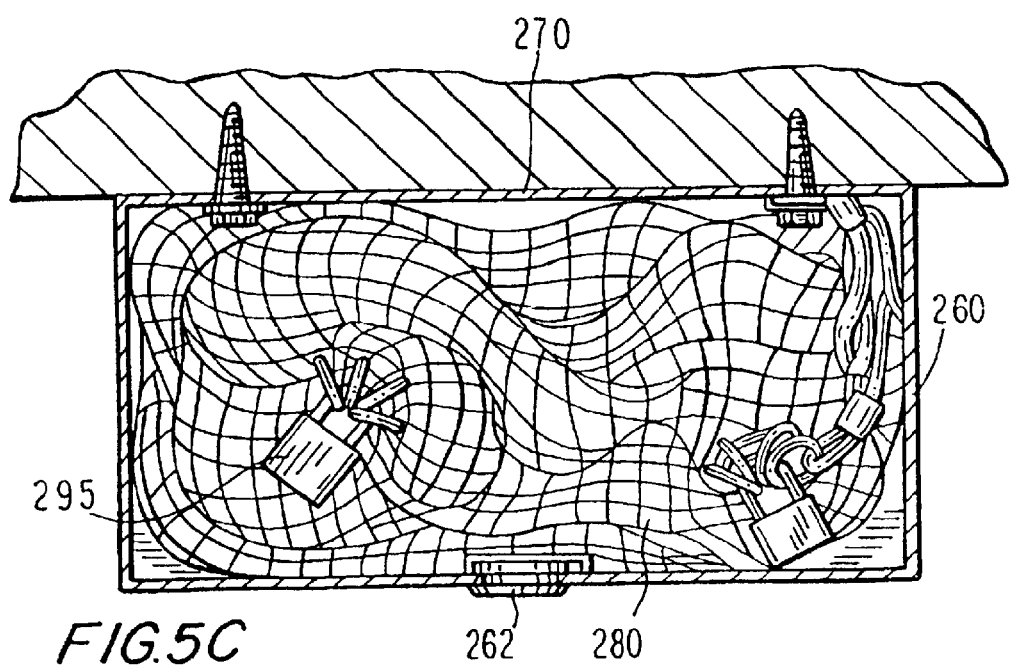
FIG. 5C is another cross-sectional view of the grocery box mounted to the wall along line 5B—5B of FIG. 5A, showing an expandable mesh net bag like that of FIGS. 8A–8C in its collapsed state while stored within the grocery box when not in use.
Figure 5B:
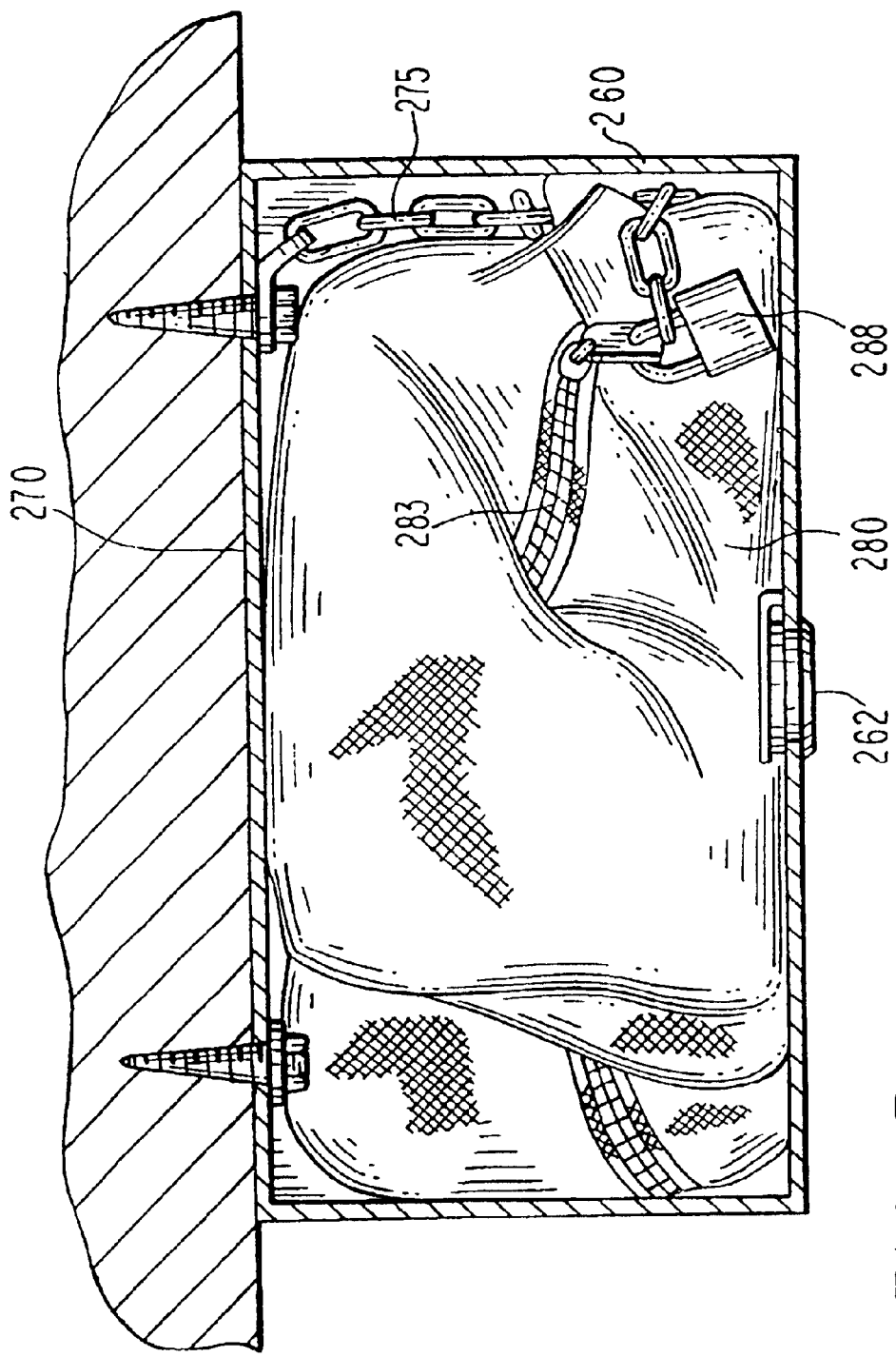
FIG. 5B is a cross-sectional view of the grocery box mounted to the wall along line 5B—5B of FIG. 5A, showing an expandable, secure bag in its collapsed state stored within the grocery box when not in use.

The van drivers start their delivery routes at approximately 1 a.m. and finish by approximately 5 a.m. (step 70). They make deliveries to customers' homes 190 in a sequence that may be determined at the time the order is placed in the computer on a route sheet. Upon reaching a customer's home, the van driver removes the tote 200 from his van and brings it near a secure storage container, like a grocery box 260 which may be made of stainless steel and is bolted or chained to some place 270 outside a customer's home, such as to a post, a door, a wall, or a floor. FIG. 5A shows one such box 260 mounted to a wall 270 away from floor 271. An expandable, secure bag 280, like a thick nylon or metal mesh net, or an insulated bag 280 which may be pleated and have a Mylar exterior, is stored in the grocery box 260 that is conceptually similar to, but generally smaller than, a milk box (step 80) and large enough to hold the bag 280. When empty, bag 280 is collapsed and folded within grocery box 260. Bag 280 is secured to the grocery box 260 with a chain or cable 275 (FIG. 5B). The driver opens an optional lock 262 on box 260, removes bag 280 from the grocery box 260, unfolds and expands bag 280, and places the tote 200 for that customer in bag 280. The expandable bag 280, when expanded, has first and second sides 281, 282. Tote 200 wrapped in bag 280 is placed on the ground adjacent to grocery box 260 while still attached to grocery box 260 with chain and cable 275 (FIG. 6). Bag 280 should be animal-proof and should be odor-proof so as not to attract animals. Alternatively, the tote 200 wrapped in bag 280 may be placed within grocery box 260 if grocery box 260 is large enough.

Figure 7:
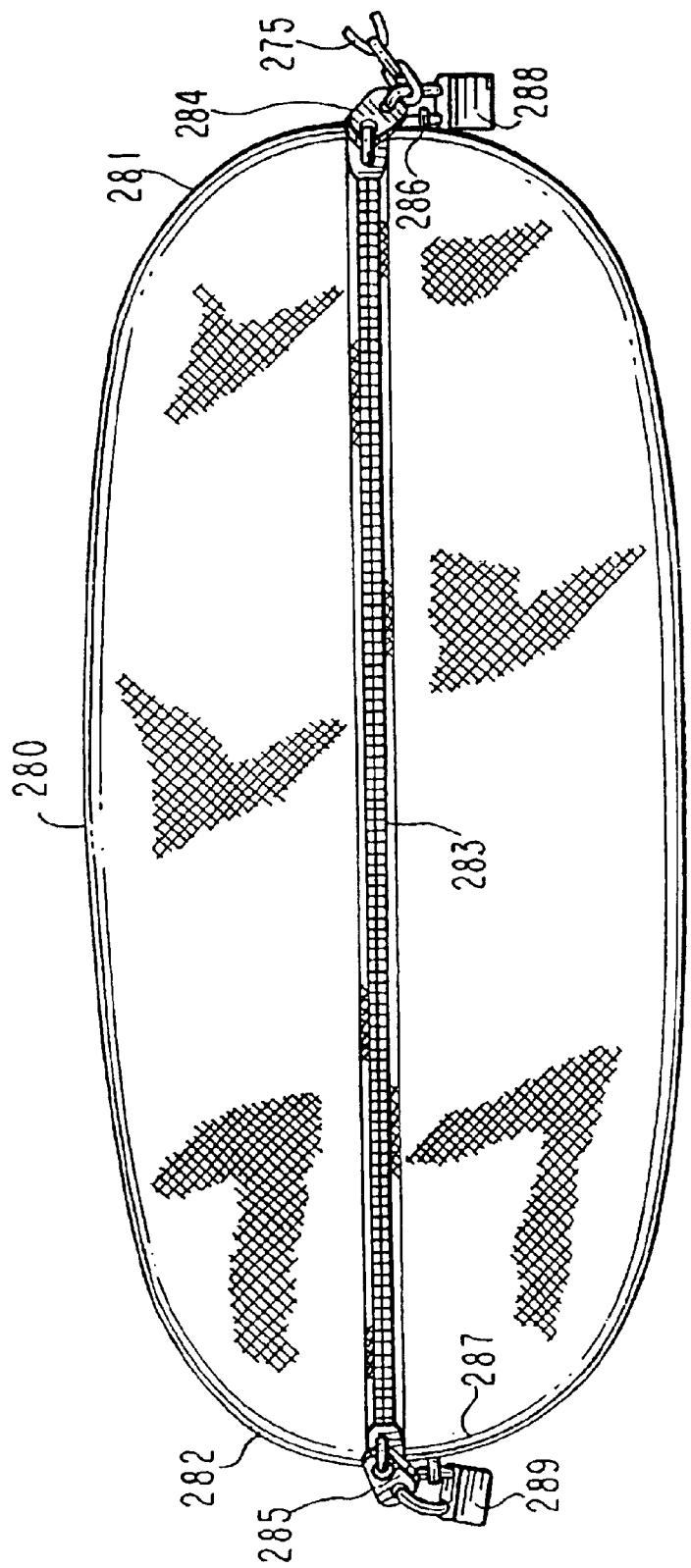
FIG. 7 is a top view of the bag of FIG. 6.

Bag 280 is cinched and locked (step 90) with a locking means to hold tote 200 securely in bag 280. One contemplated locking means is a respective two-way zipper 283 having two sliding pieces 284, 285 to open and close zipper 283 from either end of the zipper. (FIG. 7) Adjacent each end of zipper 283 is a respective hook or O-ring 286, 287 attached to mesh 280. A first padlock 288 may be looped through a hole in the first sliding piece 284 when it is moved to its fully closed position at side 281 and through hook 286 to lock zipper 283 on this first end. This padlock 288 may be opened by the van driver to open the mesh, insert the tote 200 therein, and then relock the mesh 280. A second padlock 289 may be looped through a hole in the second sliding piece 285 when that piece is in its fully closed position at side 282 and through hook 287 to lock zipper 283 on this second end. The customer can unlock this second padlock 289 to remove the tote 200.

Figure 8B:
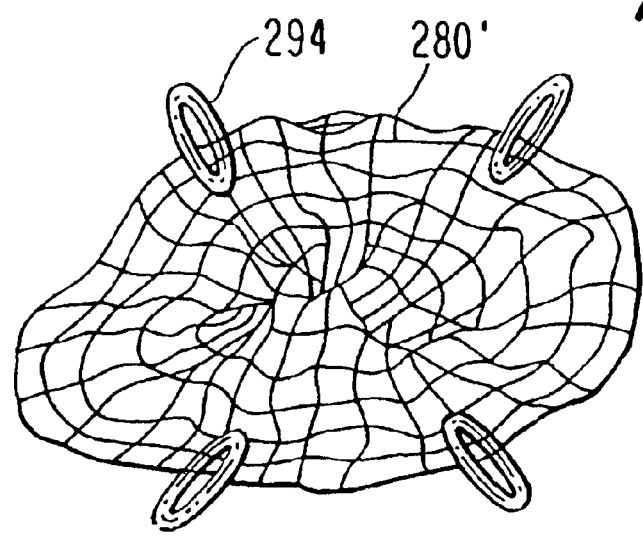
FIG. 8B is a side view of the bag of FIG. 8A with a side of the bag unlocked.
Figure 8C:
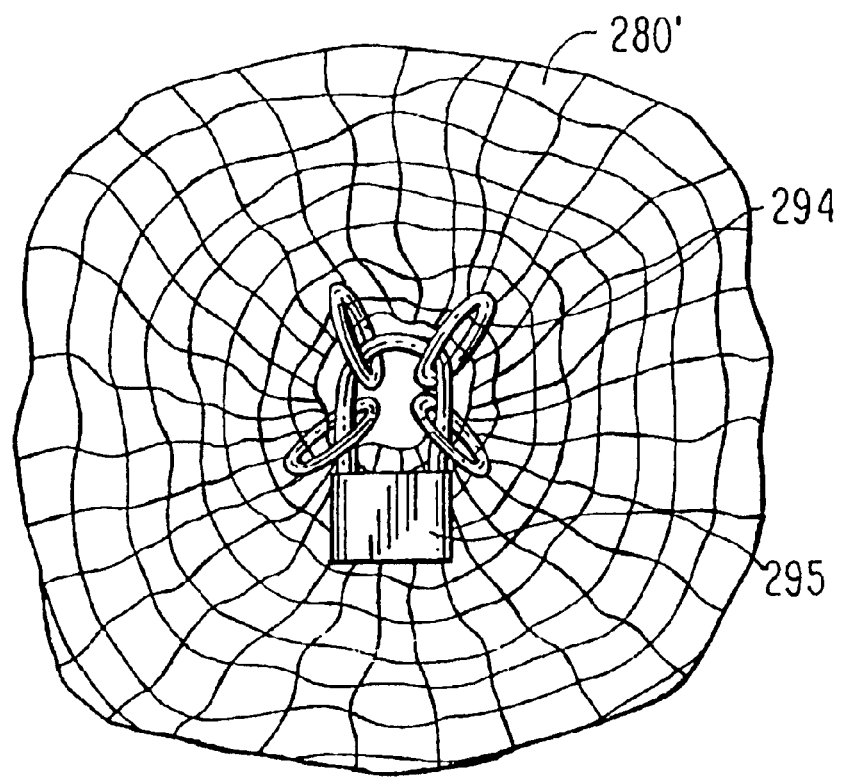
FIG. 8C is a side view of the bag of FIG. 8A with a side of the bag locked.

Alternatively, instead of having a zipper 283, bag 280 may be made of a mesh net 281 (FIGS. 8A–C) that has an opening 290, 291 on each of respective sides 292, 293. A plurality of O-rings 294 are attached to each of respective sides 292, 293. O-rings 294 on each side may be linked together with other O-rings on that side by hooking a padlock through them. FIG. 8C shows padlock 295 closing side 292 with O-rings 294. A similar padlock is used to close side 293. With padlock 295 removed, side 292 of the mesh net 281 may be spread open and the van driver is able to insert tote 200 within mesh 280'. The van driver then gathers together O-rings 294 on side 292, hooks padlock 293 though these O-rings 294, and locks padlock 295. The customer can remove tote 200 by removing the customer's padlock (not shown) from O-rings 292 on the opposite side 293 of the mesh net 281. Where bag 280 is sufficiently large, multiple totes 200 may simultaneously secured within bag 280.

Tote 200 remains locked in bag 280 until the customer retrieves the tote and returns the bag into the grocery box 260 (step 100). The customer thereafter removes the groceries from the tote 200, removes bag 280 from grocery box 260, unlocks the customer padlock on bag 280, places the used tote 200 and any frozen inserts 210, which are nestable, back inside the bag 280 secured to the grocery box 260, and relocks the padlock before the next expected delivery to that customer, for pickup by the van during the next delivery (step 110).

After picking up the used totes 200, the van driver returns the emptied totes 200 to the trailer 160 later that evening, at the transfer point 170 to which he travels to pick up filled totes 200 from the warehouse 150 for delivery. The emptied totes are returned to the warehouse 150 for cleaning and reuse. Customers may be required to put down a deposit to insure against loss or damage to the tote 200 and freezing insert 210. The van driver may also pick up used totes 200 from homes where no deliveries are made. While described with reference to a method of delivering groceries, bag 280 of FIGS. 7 and 8A–8C may be used to secure things other than totes 200 of groceries, either in combination with a grocery box 260 of the type described or independently thereof.

Figure 9:
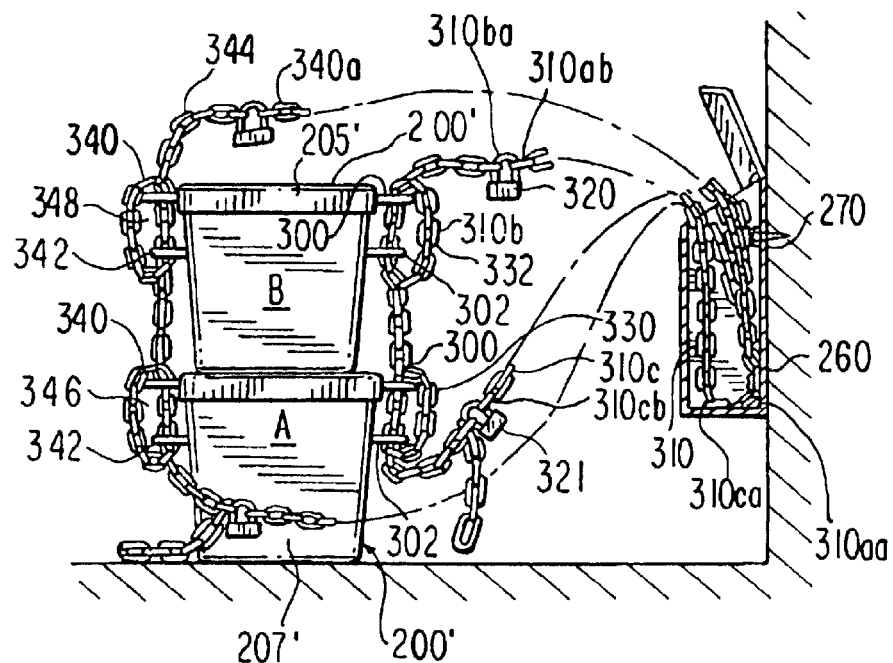
FIG. 9 is a perspective view of multiple totes secured to a grocery box with two multi-section chains.

FIG. 9 illustrates another manner in which a single tote or multiple totes may be secured outside a delivery destination, other than in a bag 280. Tote 200' is a modified version of tote 200 in which an eyelet 300 is located on the exterior of a first side of a cover 205' of tote 200'. A corresponding eyelet 302 is located on the exterior of the main structure 207' of tote 200' substantially beneath eyelet 300 on the first side of tote 200'. Otherwise, tote 200' may be identical to tote 200, such as having an internal cavity 213 within the main structure 207' and being similarly maintainable at a desired temperature inside cavity 213. As before, box 260 is mounted to a place 270 outside the delivery destination 190. However, rather than securing tote 200' inside a bag 280, tote 200' is secured to box 260 with a multi-sectioned chain 310 comprising sections 310a, 310b, and 310c. When not in use, chain 310 is stored within box 260 and box 260 may be locked with a lock, like lock 262 (FIG. 5A). Sections 310a and 310c are secured on their first ends 310aa, 310ca, respectively, to box 260, either at a single location on box 260 or at two separate locations therein. Section 310b is secured to a second end 310ab of section 310a with lock 320 and is secured to a second end 310cb of section 310c with lock 321.

To deliver a tote 200', the van driver/delivery person opens box 260 (opening the lock, if any, to gain access to the chain 310 stored in box 260), and removes a portion of chain 310 that is removable from box 260 (some of chain 310 may remain in box 260 due to the placement of the mounting means of the first ends 310aa, 310ca somewhere inside box 260), while the respective first ends 310aa, 310ca of the first and third chain sections 310a, 310c, remain attached to box 260. The delivery person opens lock 320 (or lock 321, whichever he is given access to) and removes lock 320 from section 310b. The now loose end 310ba of section 310b is inserted through the first pair of eyelets 300, 302 on the first side. The loose end 310ba of section 310b is then looped around and through eyelets 300, 302 to form loop 330. For example, end 310ba of section 310b may be inserted through the bottom of eyelet 302 and out the top of eyelet 300, looped back around the outside of the eyelets 300, 302, and again up through eyelet 300. After the looping, chain sections 310b, 310c are pulled taut so that the loop formed around eyelets 300, 302 tightly holds cover 205' against main structure 207'. With a sufficiently long middle section 310b, chain 310 can be used to secure more than one tote 200' by looping section 310b through eyelets 300, 302 on a first tote 200' A and then through similar eyelets on a second tote 200' B that is stacked above tote A (or placed nearby) to form loop 332 and to use loops 330, 332 to tighten the covers 205' of totes A and B to their respective main structures 207'. Lock 320 is then replaced to connect sections 310a and 310b. To keep the loops 330, 332 tight, lock 320 is inserted through link 310ba in section 310b that need not be the final link in that section 310b, but may be another link in section 310b.

The loops 330, 332 formed on the single side of tote 200' cannot by itself fully secure tote cover 205' to main structure 207'. Thus, a second pair of eyelets is placed on the opposite side of tote 200' from the side on which the first pair of eyelets is located, the second pair comprising a third eyelet 342 on main structure 207' and a fourth eyelet 344 on cover 205' substantially in proximity to eyelet 342. A second multi-sectioned chain 340, identical to chain 310 and having sections 340a, 340b, and 340c, may be similarly attached to box 260 and looped through eyelets 342, 344 to form loop 346. Middle section 340b, if sufficiently long, may be used to similarly form a second loop 348 on a second tote 200'B stacked above the first tote 200'A. Chain 340 may likewise be stored in box 260 when not in use.

In lieu of second chain 340 and the second pair of eyelets 342, 344, a tote 220", which is another variation of totes 200 and 200', may comprises a first pair of eyelets 300, 302 on a first side, but have a hinge 350 on the side opposite the first side to securely connect the cover 205" to the main structure 207".

Where tote 200' or tote 200" is used, the customer retrieves tote 200' or tote 200" by removing lock 321 to separate sections 310b and 310c and removing the loop created with section 310b through eyelets 300, 302. Additionally, second chain 340 must be removed from tote 200'. After removing tote(s) 200', the customer returns lock 321 to reconnect chain sections 310b and 310c and chains 310, 340 may again be stored inside box 260.

Other embodiments for achieving the objectives of the invention may utilize, for example, a two-section chain lined by a single lock having multiple ways of opening the lock, including one way that only the delivery person can use to open the lock and a second way that only the customer can use to open the lock.

The following paragraphs will describe a general preferred embodiment of a method according to the present invention (with reference to FIG. 11), as well as various specific embodiments and variations.

Figure 10:
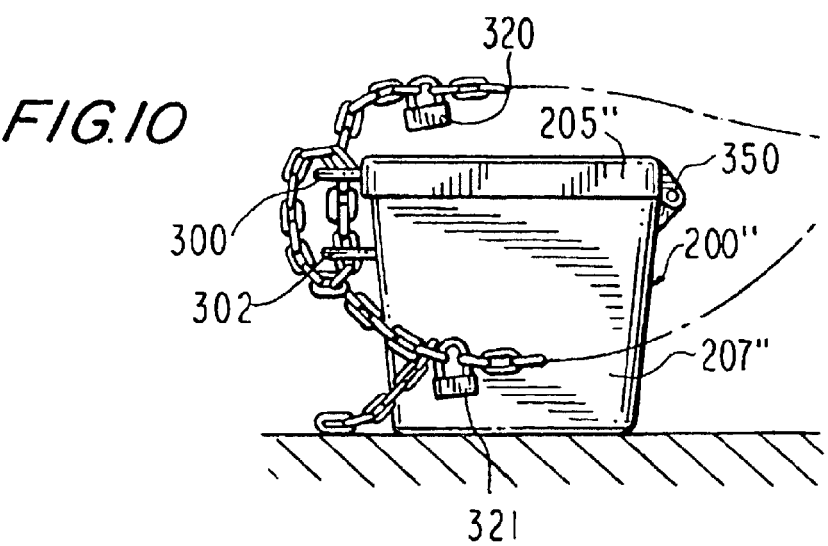
FIG. 10 is a perspective view of a tote secured to a grocery box on one side with a single multi-section chain and on its opposite side with a hinge.
Figure 11:
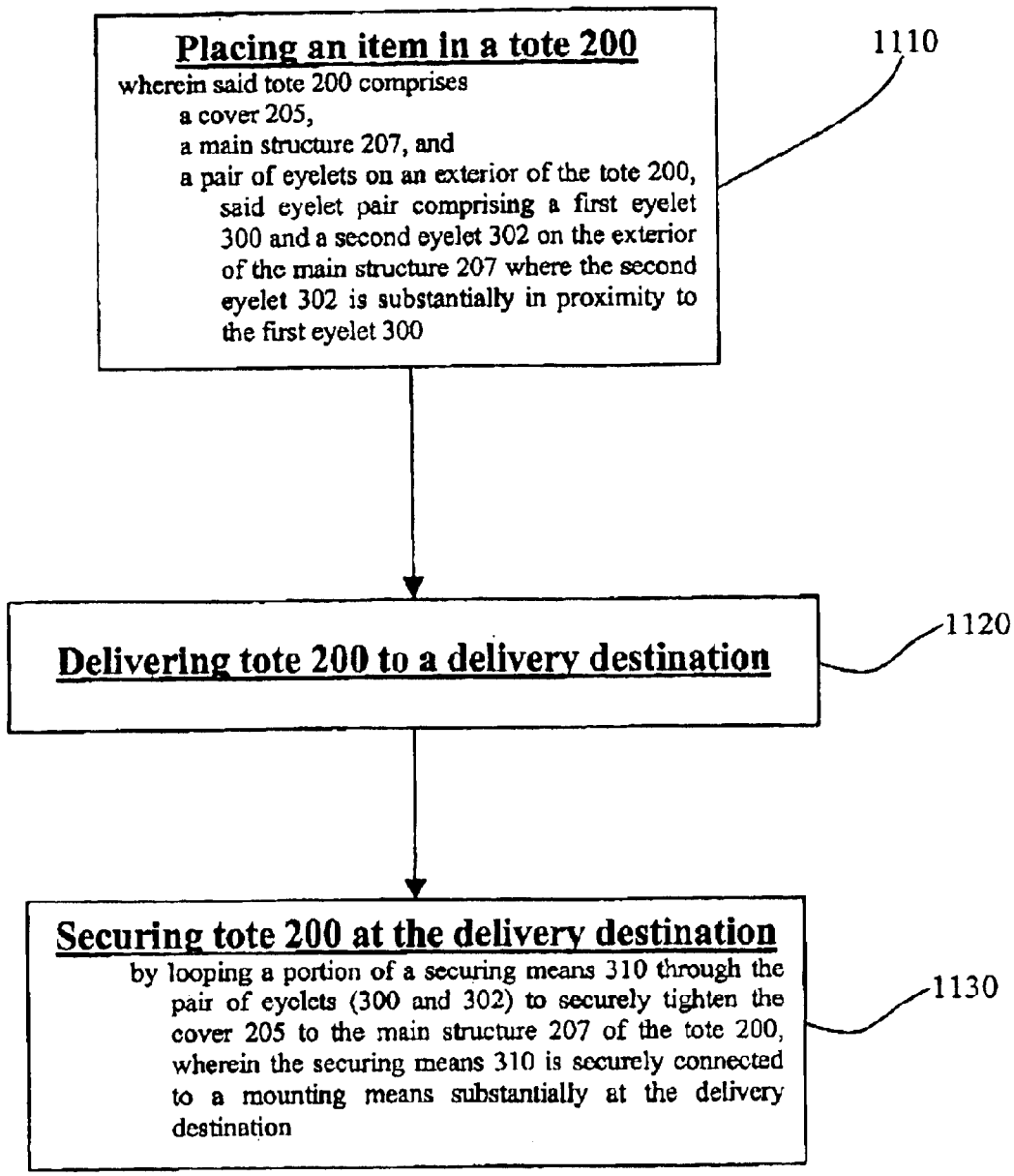
FIG. 11 is a flowchart of a general method according to a preferred embodiment of the present invention.

In one method according to a preferred embodiment of the present invention, as shown in FIG. 11 (with reference to FIGS. 9 and 10), there would be three basic steps: placing an item in a tote 200 (step 1110), wherein said tote 200 comprises a cover 205, a main structure 207, and a pair of eyelets on an exterior of the tote 200, said eyelet pair comprising a first eyelet 300 and a second eyelet 302 on the exterior of the main structure 207 where the second eyelet 302 is substantially in proximity to the first eyelet 300; delivering the tote 200 to a delivery destination (step 1120); and securing the tote 200 substantially at the delivery destination (step 1130) by looping a portion of a securing means 310 through the pair of eyelets (300 and 302) to securely tighten the cover 205 to the main structure 207 of the tote 200, wherein the securing means 310 is securely connected to a mounting means substantially at the delivery destination.

As shown in the embodiment of FIG. 11A, the method according to FIG. 11 can also include the step 11XX (the reference numeral "11XX" is used to indicate that this step may occur before or after the steps in FIG. 11) of bolding the securing means 310 inside the storage container 260 when the securing means 310 is not in use, wherein the securing means 310 is securely connected to a storage container 260 mounted in proximity to the delivery destination.

Figure 11B:
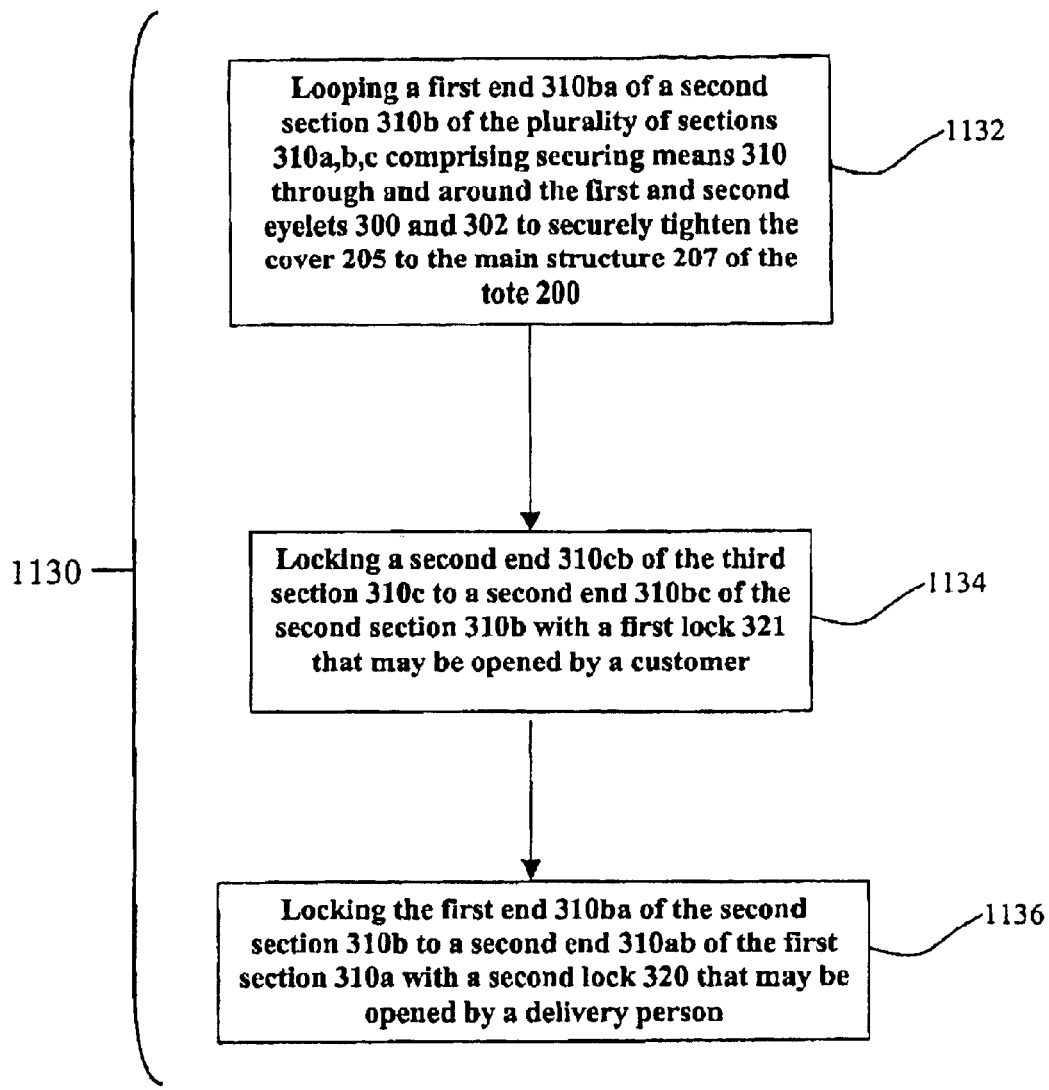
FIGS. 11B and 11F show specific embodiments of one or more steps in FIG. 11.

As shown in the embodiment of FIG. 11B, when the securing means 310 comprises a plurality of sections 310a, b, c, and a first end 310aa of a first section 310a of the plurality of sections 310a,b,c is securely connected to a mounting means, and a first end 310ca of a third section 310c is securely mounted to a mounting means, step 1130 of FIG. 11 can comprise the following sub-steps:

Step 1132: looping a first end 310ba of a second section 310b of the plurality of sections 310a,b,c comprising securing means 310 through and around the first and second eyelets 300 and 302 to securely tighten the cover 205 to the main structure 207 of the tote 200;

Step 1134: locking a second end 310cb of the third section 310c to a second end 310bc of the second section 310b with a first lock 321 that may be opened by a customer; and Step 1136: after completing step 1132, locking the first end 310ba of the second section 310b to a second end 310ab of the fast section 310a with a second lock 320 that maybe opened by a delivery person.

As shown in the embodiment of FIG. 11C, when the method of FIG. 11B is used, the general method of FIG. 11 may further comprise step 1140 of retrieving, by the customer, the tote 200 by unlocking the first lock and removing the looped section of the securing means 310 from the first and second eyelets.

The embodiment of FIG. 11D shows what step 1130 of FIG. 11 may be comprised of, if the tote 200 further comprised another eyelet pair, namely the third and fourth eyelets 344 and 342, respectively, on another side of tote 200, where the third eyelet 344 is on the exterior of the cover 205 of tote 200 and the fourth eyelet 342 is on the main structure 207 of the tote in substantial proximity to third eyelet 344. Namely, in that embodiment, step 1130 would comprise the step of looping a second securing means 310 through the third and fourth eyelets 344 and 342, respectively, to securely tighten the cover 205 to the main structure 207 of the tote 200 on the second side (step 1133).

As shown in the embodiment of FIG. 11E, if the item in tote 200 is a grocery item, the general method of FIG. 11 may comprise the further step 1115 of maintaining the grocery item at a desired temperature by either placing a frozen insert in the tote 200 in proximity to the grocery item or by feeding a chilled gas into at least a portion of the tote 200. It should be understood that, although the reference numeral "1115" is used to indicate this step, thereby implying it occurs as part of step 1110 in FIG. 11, it is possible for this step to occur at any time, including, for example, at the time of delivery.

Figure 11F:
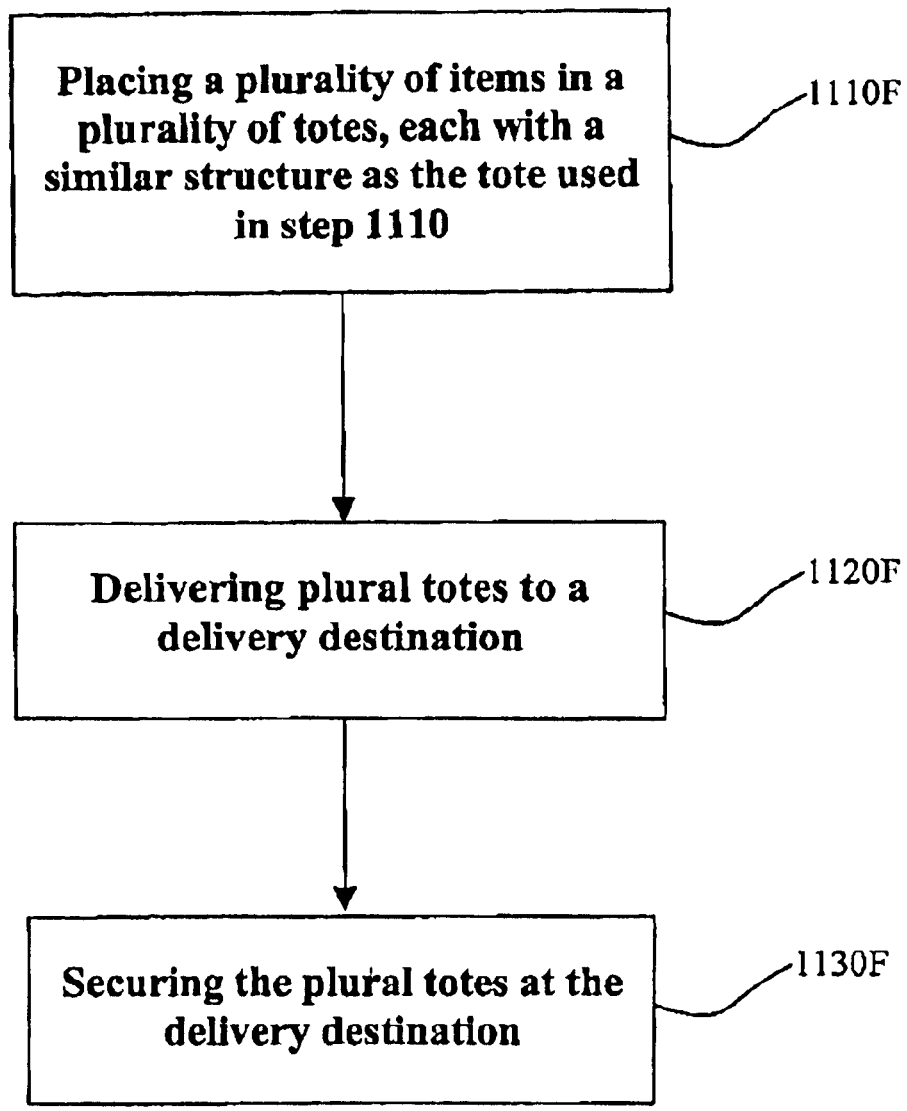

A different embodiment is shown in FIG. 11F, where the number or size of items to be delivered necessitate that a number of totes be used to secure the items at the delivery destination. In FIG. 11F, Step 1110 of FIG. 11 becomes step 1110F, in which the plurality of items are placed in a plurality of totes, each with a similar structure as the tote used in step 1110. After delivery in step 1120F, the method of FIG. 11E requires that step 1130 be performed for all of the plural totes in step 1130F because there are a plurality of totes.

The above-described method offers many advantages over the prior art. Because there is no more than approximately a 5 to 6 hour travel radius from warehouse 150 to customer 190, this method of distribution will require fewer supervisors and physical facilities to serve a given population. It will also require less total inventory than systems with shorter travel radii, and will increase inventory turnover and the variety of goods that may be stocked. Other advantages include:

1. Van drivers may serve as auxiliary eyes and ears of the local police as a community service.
2. By delivering to customers' homes between 1 am. and 5 a.m., deliveries can be made without worrying about traffic congestion and can use the most fuel efficient routing. This method is also environmentally responsible as early morning deliveries do not slow other vehicles or cause more congestion during business hours and the number of trips required to the supermarkets or grocery stores is reduced. A customer also need not be concerned with finding a parking spot for his car while shopping.
3. This business method may use electric vans for local deliveries, particularly those with batteries acting as flywheels which absorb mechanical energy on breaking and release on acceleration while supplying stored electrical power to motors.
4. A single sales/service representative can cover a broad area and does not have to be concerned with deliveries, which are made by the van drivers. This may improve customer relations because it may prove difficult to find friendly, competent sales staff. It is therefore helpful to have a single competent person to promote the business to a greater number of potential customers. The sales representative can provide and install the grocery box, provide an introductory coupon, send a personal note on significant occasions, such as birthdays and anniversaries, and guarantee satisfaction by quickly replacing any unsatisfactory products (either by a van dispatched from the warehouse 150 or by purchasing a replacement product at a local source and personally delivering it.)
5. This method requires less capital then other grocery delivery methods that promise quick delivery during the daylight hours. As explained above, those other methods require more distribution warehouses because of their necessarily smaller travel radius between their warehouse and their customers' homes. Moreover, to deliver groceries within a short time, such as one half hour, after an order is placed, the delivery trucks may be routed to the customer in an environmentally irresponsible manner.
6. This method eliminates the need for refrigerated vans, which waste an enormous amount of energy as the van door is opened at every delivery point. (Refrigerated trailers must be kept at 35° F.)

Despite the advantages offered by the described method of distributing groceries, some customers may not wish to have their groceries delivered in a secure bag outside their home. These customers can be accommodated by giving them the option of shipping a tote 200 of groceries through another delivery method, such as regular next day delivery by an overnight delivery service such as the United Parcel Service. Using next day delivery, groceries in tote 200 can also be kept at the desired chilled temperature using a similar refrigeration method, such as frozen inserts 210 or chilled gas.

Thus, while there have shown and described and pointed out fundamental novel features of the invention as applied to a preferred embodiment thereof, it will be understood that various omissions and substitutions and changes in the form and details of the methods and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

I claim:

1. A method of securely delivering to a delivery destination a tote for holding an item, the method comprising the steps of:

placing the item in a tote, wherein said tote comprises a cover, a main structure, a first pair of eyelets on a first side of an exterior of the tote, including a first eyelet on an exterior or the cover and a second eyelet on the exterior of the main structure substantially in proximity to the first eyelet, and a second pair of eyelets on a second side of the exterior of the tote, including a third eyelet on the exterior of the cover and a fourth eyelet on the exterior of the main structure substantially in proximity to the third eyelet;

delivering the tote to a delivery destination; and securing the tote substantially at the delivery destination by:

looping a portion of a first securing means through the first pair of eyelets to securely tighten the cover to the main structure of the tote on the first side, wherein the first securing means is securely connected to a mounting means substantially at the delivery destination; and looping a second securing means through the third and fourth eyelets to securely tighten the cover to the main structure of the tote on the second side.

2. The method of claim 1, wherein the first securing means is securely connected to a storage container mounted in proximity to the delivery destination, and wherein the method further comprises the step of:

holding the securing means inside the storage container when the first securing means is not in use.

3. The method of claim 1, wherein the mounting means comprises a first and second mounting means, wherein the fit securing means comprises a plurality of sections, a first end of a first section of the plurality of sections being securely connected to the first mounting means, and a first end of a third section of the plural sections being securely connected to the second mounting means, and wherein the step of securing the tote substantially at the delivery destination comprises the steps of:

looping a first end of a second section of the plurality of sections through and around the first and second eyelets to securely tighten the cover to the main structure of the tote on the first side, wherein a second end of the third section is attached to a second end of the second section with a first lock that may be opened by a customer; and after looping the first end of the second section around the first and second eyelets, locking the first end of the second section to a second end of the first section with a second lock that may be opened by a delivery person.

4. The method of claim 3, further comprising the step of:

retrieving, by the customer, the tote by unlocking the first lock and removing the looped section of the first securing means from the first and second eyelets.

5. The method of claim 1, wherein the tote further comprises a hinge on a second side of the tote to connect the cover to the main structure of the tote.

6. The method of claim 1, where the item comprises a grocery item, and wherein the method further comprises the step of:

maintaining the grocery item at a desired temperature by placing a frozen insert in the tote in proximity to the grocery item.

7. A method of securely delivering to a delivery destination a tote for holding an item, comprising the steps of:

placing the item in a tote, wherein said tote comprises a cover, a main structure, and a pair of eyelets on an exterior of the tote, including a first of the pair of eyelets on exterior of the cover and a second of the pair of eyelets on the exterior of the main structure substantially in proximity to the first eyelet;

delivering the tote to a delivery destination; and securing the tote substantially at the delivery destination, wherein the delivery destination has a securing means for securing the tote at the delivery destination, wherein the securing means is securely connected to first and second mounting means at the delivery destination wherein the securing means comprises a plurality of sections, a first end of a first section of the plurality of sections being securely connected to the first mounting means, and a first end of a third section of the plural sections being securely connected to the second mounting means, and wherein said step of securing the tote comprises the steps of:

looping a first end of a second section of the plurality of sections through and around the first and second eyelets to securely tighten the cover to the main structure of the tote, wherein a second end of the third section is attached to a second end of the second section with a first lock that may be opened by a customer; and after looping the first end of the second section around the first and second eyelets, locking the first end of the second section to a second end of the first section with a second lock that may be opened by a delivery person.

8. The method of claim 7, further comprising the step of:

retrieving, by the customer, the item from the tote by the first lock and removing the looped section of the securing means from the first and second eyelets.

9. The method of claim 7, wherein the first and second mounting means are securely connected to a storage container mounted in proximity to the delivery destination, and wherein the method further comprises the step of:

holding the securing means inside the storage container when the securing means is not in use.

10. The method of claim 7, wherein the tote further comprises a second pair of eyelets on a second side of the tote, including a third eyelet on the exterior of the cover and a fourth eyelet on the exterior of the main structure substantially in proximity to the third eyelet, and wherein the step of securing the tote substantially at the delivery destination comprises the step of:

looping a second securing means through the third and fourth eyelets to securely tighten the cover to the main structure of the tote on the second side.

11. The method of claim 7, wherein the tote further comprises a hinge on a second side of the tote to connect the cover to the main structure of the tote.

12. The method of claim 7, wherein the item comprises a grocery item, and wherein the method further comprises the step of:

maintaining the grocery item at a desired temperature by placing a frozen insert in the tote in proximity to the grocery item.

13. A method of securely delivering to a delivery destination a plurality of totes for holding a plurality of item, comprising the steps of:

placing the plural items in the plural totes, wherein each of said plural totes comprises a cover, a main structure, and a pair of eyelets on an exterior of the tote, including a first of the pair of eyelets on exterior of the cover and a second of the pair of eyelets on the exterior of the main structure substantially in proximity to the first eyelet;

delivering the plural totes to a delivery destination; and securing the plural totes substantially at the delivery destination, wherein the delivery destination has a securing means for securing the plural totes at the delivery destination, wherein the securing means is securely connected to first and second mounting means at the delivery destination, wherein the securing means comprises a plurality of sections, a first end of a first section of the plurality of sections being securely connected to the first mounting means, and a first end of a third section of the plural sections being securely connected to the second mounting means, and wherein said step of securing the plural totes comprises the steps of:

looping a first end of a second section of the plurality of sections through and around the first and second eyelets of each of the plural totes to securely tighten the cover of each tote to the main structure of each tote, wherein a second end of the third section is attached to a second end of the second section with a first lock that may be opened by a customer; and after looping the first end of the second section around the first and second eyelets of all of the plural tote, locking the first end of the second section to a second end of the first section with a second lock that may be opened by a delivery person.

14. The method of claim 13, further comprising the step of:

retrieving, by the customer, the plurality of items from the plural totes by first unlocking the first lock and removing the looped section of the securing means from the first and second eyelets of each tote.

15. The method of claim 13, wherein the first and second mounting means are securely connected to a storage container mounted in proximity to the delivery destination, and wherein the method further comprises the step of:

holding the securing means inside the storage container when the securing means is not in use.

16. The method of claim 13, wherein each of the plural totes further comprises a second pair of eyelet on a second side of the tote, including a third eyelet on the exterior of the cover and a fourth eyelet on the exterior of the main structure substantially in proximity to the third eyelet, and wherein the step of securing the plural totes substantially at the delivery destination further comprises the step of:

looping a second securing means through the third and fourth eyelets of each of the plural totes to securely tighten the cover of each tote to the main structure of each tote on the second side of each tote.

17. The method of claim 13, wherein each of the plural totes further comprises a hinge on a second side of the tote to connect the cover to the main structure of the tote.

18. The method of claim 13, wherein the plural items comprises grocery items, and wherein the method fit comprises the step of:

maintaining at least one of the grocery items at a desired temperature by placing a frozen insert in proximity to the grocery item in a tote in which the at last one of the grocery items was placed.

* * * * *